(12) United States Patent
Gatt

(10) Patent No.: US 12,340,633 B2
(45) Date of Patent: Jun. 24, 2025

(54) SYSTEMS AND METHODS FOR MAIL-IN BALLOT STATUS REPORTING

(71) Applicant: I3LOGIX, INC., Denver, CO (US)

(72) Inventor: Steven Charles Gatt, Evergreen, CO (US)

(73) Assignee: I3LOGIX, INC., Denver, CO (US)

( * ) Notice: Subject to any disclaimer, the term of this patent is extended or adjusted under 35 U.S.C. 154(b) by 0 days.

(21) Appl. No.: 18/417,526

(22) Filed: Jan. 19, 2024

(65) Prior Publication Data

US 2024/0161564 A1    May 16, 2024

Related U.S. Application Data

(63) Continuation of application No. 18/134,797, filed on Apr. 14, 2023, which is a continuation of application No. 15/711,351, filed on Sep. 21, 2017, now Pat. No. 11,670,127, which is a continuation of application No. 12/698,825, filed on Feb. 2, 2010, now abandoned.

(51) Int. Cl.
  *G07C 13/00*    (2006.01)
  *G06F 16/30*    (2019.01)
  *G06F 21/30*    (2013.01)

(52) U.S. Cl.
  CPC .......... *G07C 13/00* (2013.01); *G06F 16/30* (2019.01); *G06F 21/30* (2013.01); *G06Q 2230/00* (2013.01)

(58) Field of Classification Search
  CPC ......... G07C 13/00; G06F 16/30; G06F 21/30; G06Q 2230/00
  See application file for complete search history.

(56) References Cited

U.S. PATENT DOCUMENTS

| | | | |
|---|---|---|---|
| 5,915,730 A * | 6/1999 | Petkovsek | B42D 15/006 283/79 |
| 6,772,130 B1 * | 8/2004 | Karbowski | G06Q 30/0601 705/26.1 |
| 7,216,807 B2 | 5/2007 | Mcclure | |
| 11,670,127 B1 | 6/2023 | Gatt | |
| 2004/0041017 A1 * | 3/2004 | McClure | G07C 13/00 235/375 |
| 2004/0128190 A1 * | 7/2004 | Campo | G06Q 50/26 705/12 |
| 2004/0169077 A1 | 9/2004 | Petersen et al. | |
| 2005/0061866 A1 * | 3/2005 | Ackley | G07C 13/00 229/80 |
| 2006/0053084 A1 * | 3/2006 | Haas | G07B 17/00435 705/410 |

(Continued)

OTHER PUBLICATIONS

Chantal Enguehard et al., Vulnerability Analysis of Three Remote Voting Methods, Aug. 7, 2009, Arxiv, pp. 1-15 (Year: 2009).*

(Continued)

*Primary Examiner* — Nilesh B Khatri
(74) *Attorney, Agent, or Firm* — Greenberg Traurig LLP

(57) ABSTRACT

Systems and methods for monitoring and reporting the status of paper ballots for mail-in voting are provided. The paper ballots are monitored during their transit to and/or from the voters. Reports regarding the status of such paper ballots may be provided to the voters and/or the elections division. Such reports may facilitate increased transparency into the mail-in voting process.

26 Claims, 11 Drawing Sheets

(56) References Cited

U.S. PATENT DOCUMENTS

| | | | |
|---|---|---|---|
| 2006/0053085 A1* | 3/2006 | Guyett | G07B 17/00467 |
| | | | 705/410 |
| 2006/0070119 A1 | 3/2006 | Ogram | |
| 2006/0229895 A1* | 10/2006 | Kodger, Jr. | G06Q 10/083 |
| | | | 705/333 |
| 2006/0238334 A1* | 10/2006 | Mangan | G06Q 10/08 |
| | | | 340/539.13 |
| 2007/0000989 A1* | 1/2007 | Kadaba | B07C 3/008 |
| | | | 235/375 |
| 2007/0007341 A1 | 1/2007 | Poulin et al. | |
| 2007/0192176 A1 | 8/2007 | Onischuk | |
| 2007/0267493 A1 | 11/2007 | Coutts | |
| 2010/0100233 A1 | 4/2010 | Lu | |
| 2010/0190510 A1* | 7/2010 | Maranhas | G06Q 30/0261 |
| | | | 705/14.66 |

OTHER PUBLICATIONS

Business Insider; How to track your mail-in ballot at every step and make sure it's counted in November; https://www.businessinsider.com/how-to-track-the-status-of-your-mail-in-ballot-2020-9; Nov. 3, 2020; 10 pages.

\* cited by examiner

SYSTEMS AND METHODS FOR MAIL-IN BALLOT STATUS REPORTING

RELATED APPLICATIONS

This is a continuation application of, and claims the benefit of, U.S. Non-Provisional application Ser. No. 18/134,797, filed Apr. 14, 2023, which is a continuation of U.S. Non-Provisional application Ser. No. 15/711,351, filed Sep. 21, 2017 and granted as U.S. Pat. No. 11,670,127, which is a continuation application of U.S. Non-Provisional application Ser. No. 12/698,825, filed Feb. 2, 2010, entitled "SYSTEMS AND METHODS FOR MAIL-IN BALLOT STATUS REPORTING," by Steven Charles Gatt, the entire contents of which applications are incorporated by reference as if fully set forth herein.

BACKGROUND

Recent trends in voting include an increase in mail-in or absentee voting. For example, in 2008, a record number of people in California voted by mail. The official count by the Secretary of State for California found that over 5.7 million people voted by mail in the 2008 presidential election. This was an increase of 1.6 million mail-in voters from the 2004 presidential election, and more than double the 2.7 million mail-in voters in the 2000 presidential election.

SUMMARY OF THE DISCLOSURE

Broadly, the present disclosure relates to systems and methods for monitoring and reporting the status of mail-in paper ballots. In one aspect, a system includes a central computer system and a plurality of paper ballot materials. Each of the paper ballot materials includes a paper ballot associated with each voter of a plurality of voters. At least one unique graphical representation is associated with each of the paper ballot materials for each voter.

The central computer system includes a computerized database that stores unique voter ID data and paper ballot status data for each of the plurality of voters. The unique voter ID data includes voter identification information for each voter and UGR data (e.g., tracking number(s)) associated with each unique graphical representation. Paper ballot status data for each voter is associated with each voter's unique voter ID data. The paper ballot status data includes a status of the paper ballot materials for each voter of the plurality of voters, and which status is updated as the paper ballot materials travel to and/or from the voters. In one approach, a communication module is in communication with the computerized database, and is configured to provide at least some of the paper ballot status data (or information based thereon) to at least some voters of the plurality of voters and/or the elections division. Since the status of each voter's paper ballot materials is known and is correlated to each voter, such status may be communicated to each respective voter and/or elections division, and at any point during the mail-in ballot process. Such monitoring and communication capability facilitates greater transparency in the mail-in ballot process, which may increase voter turnout and/or voter confidence in the mail-in ballot voting process.

In one approach, the system is configured to download and/or receive status data from an outside party to update the paper ballot status data. In one embodiment, the outside status data is paper postal carrier data of a paper postal carrier. The paper postal carrier may transport the paper ballot materials and may scan the unique graphical representations to monitor/track such paper ballot materials. The paper postal carrier data may include an updated status of the paper ballot materials for one or more voters of the plurality of voters. In this regard, the central computer system may compare the updated status data received from the paper postal carrier to the current status logged in the database module. When the updated status is different than the current status, the central computer system may store the updated status. In some embodiments, when the updated status is different than the current status for one or more voters of the plurality of voters, a notification may be sent to the applicable voters. In some embodiments, the notification includes at least a portion of the updated status data, or information based thereon. These notifications may be sent by the communications module.

In one approach, the central computer system is configured to compare the status of the paper ballot status data to a predetermined criteria (e.g., goal criteria) for one or more voters of the plurality of voters. In one embodiment, when the status of the paper ballot materials for a first voter meets a predetermined criteria, an electronic message is sent to the first voter. These messages may be sent by the communications module. In one embodiment, the predetermined criteria is paper ballot materials received by the first voter but not yet returned to the elections division, and the electronic message is a reminder relating to the same. In one embodiment, the predetermined criteria is paper ballot materials accepted by the elections division, and the electronic message notifies the voter of the same. In another embodiment, the predetermined criteria is paper ballot materials rejected by the elections division, and the electronic message notifies the voter of the same.

In one approach, the central computer system is configured to determine the status of the paper ballot materials for all voters of the plurality of voters using the paper ballot status data. In this regard, a report may be prepared. The report may list the status of all paper ballot materials. This report may contain a listing of the location of paper ballot materials yet to be received by an elections division, among other statuses. This report may be used by the elections division to improve and/or determine the accuracy of election results. For example, if a paper ballot materials have not been received by one or more voters by a predetermined date, a notification may be provided, and replacement ballots may be issued so that those voters will receive the replacement paper ballot materials in sufficient time to complete the mail-in voting process. Other notifications and/or predetermined criteria may be used.

In another aspect, methods for reporting the status of paper ballot materials are provided. In one approach, a method includes preparing a list of voters (e.g., by an elections division), and, for at least a subset of voters of the list of voters, labeling a plurality of paper ballot materials. As labeled, each of the paper ballot materials includes a paper ballot for a voter and at least one unique graphical representation associated with that voter. The method may include mailing at least some of the paper ballot materials to at least some of the voters via a paper postal carrier, and determining a status of at least some of the paper ballot materials. In this regard, the determining step may include updating and/or reporting data associated with the unique graphical representations located on the paper ballot materials. The method may further include reporting such status/statuses to: (i) one or more voters of the subset of voters and/or (ii) the elections division.

In one embodiment, the method includes associating, for each voter of the subset of voters, voter identification information with corresponding UGR data, thereby creating unique voter ID data, and storing this unique voter ID data. In this regard, each of the UGR data for each of the voters corresponds to the at least one unique graphical representation located on each voter's corresponding paper ballot materials. The method may also include associating paper ballot status data with one or more voters of the list of voters.

In one embodiment, the reporting step includes locating voter identification information for a first voter via the unique voter ID data, and sending, in response to the locating step, at least a portion of the paper ballot status data (or information relating thereto) to this first voter. These messages may facilitate increased voter turnout and/or voter confidence in the mail-in ballot voting process. In one embodiment, the method includes, prior to the sending step, receiving an inquiry by the first voter regarding the status of his/her paper ballot, and determining, in response to the receiving an inquiry step, the status of the paper ballot materials for the first voter using the paper ballot status data. In turn, the sending step may be completed. In another embodiment, a method comprises updating the paper ballot status data of the first voter from a current status to an updated status, and completing the sending step in response to the updating the paper ballot status data step. In some embodiments, the determining step includes downloading, from the paper postal carrier, paper postal carrier data, where the paper postal carrier data includes the updated status of the paper ballot materials for the first voter. Concomitantly, the updated status may be compared to the current status for the first voter. When the updated status is different than the current status, the method may include completing the updating and sending steps. In one embodiment, the method includes scanning the at least one graphical representation associated with the first voter, and preparing, in response to the scanning step, the paper postal carrier data. These steps may be completed/repeated for some or all other voters of the plurality of voters.

In one embodiment, a method includes determining the status of the paper ballot materials of a first voter, and, when the status of the paper ballot materials meets a predetermined criteria, sending an electronic message to the first voter. In one embodiment, the predetermined criteria is paper ballot materials received by the first voter but not yet returned to the elections division, and the electronic message relates to the same. In another embodiment, the predetermined criteria is paper ballot accepted by the elections division, and the electronic message relates to the same. In another embodiment, the predetermined criteria is paper ballot rejected by the elections division, and the electronic message relates to the same. These messages, among others, may facilitate increased voter turnout and/or voter confidence in the mail-in ballot voting process. Again, these steps may be completed/repeated for some or all other voters of the plurality of voters.

In one embodiment, a method includes determining the status of the paper ballot materials for all voters of the subset of voters, and preparing a report based thereon. In one embodiment, the determining comprises at least one of: (i) determining how many paper ballot materials have been received by the elections division; (ii) determining how many paper ballot materials are in transit to the elections division by a paper postal carrier; and (iii) determining how many paper ballot materials have yet to be mailed to the elections division. Other determinations may be made. In one embodiment, the reporting step include reporting, to the elections division, the status of the paper ballot materials for at least some of the voters of the subset of voters. These reports may be used by the elections division to improve and/or determine the accuracy of election results.

Various ones of the unique aspects, approaches, and embodiments noted above may be combined to yield various unique systems and methods for reporting the status of paper ballot materials. Furthermore, these and other aspects and advantages, and novel features of this new technology are set forth in part in the description that follows, and will become apparent to those skilled in the art upon examination of the following description and figures, or will be learned by practicing one or more embodiments of the technology provided for by the present disclosure.

BRIEF DESCRIPTION OF THE DRAWINGS

FIG. 5b is a flow chart illustrating one embodiment of preparing and associating various data relative to the method illustrated in FIG. 5a.

FIG. 5c is a flow chart illustrating one embodiment of mailing and determining/monitoring the status paper ballot materials relative to the method illustrated in FIG. 5a.

FIG. 5d is a flow chart illustrating one embodiment of reporting paper ballot status data to voters relative to the method illustrated in FIG. 5a.

FIG. 5e is a flow chart illustrating one embodiment of reporting global paper ballot status data relative to the method illustrated in FIG. 5a.

DETAILED DESCRIPTION

Figure 1:
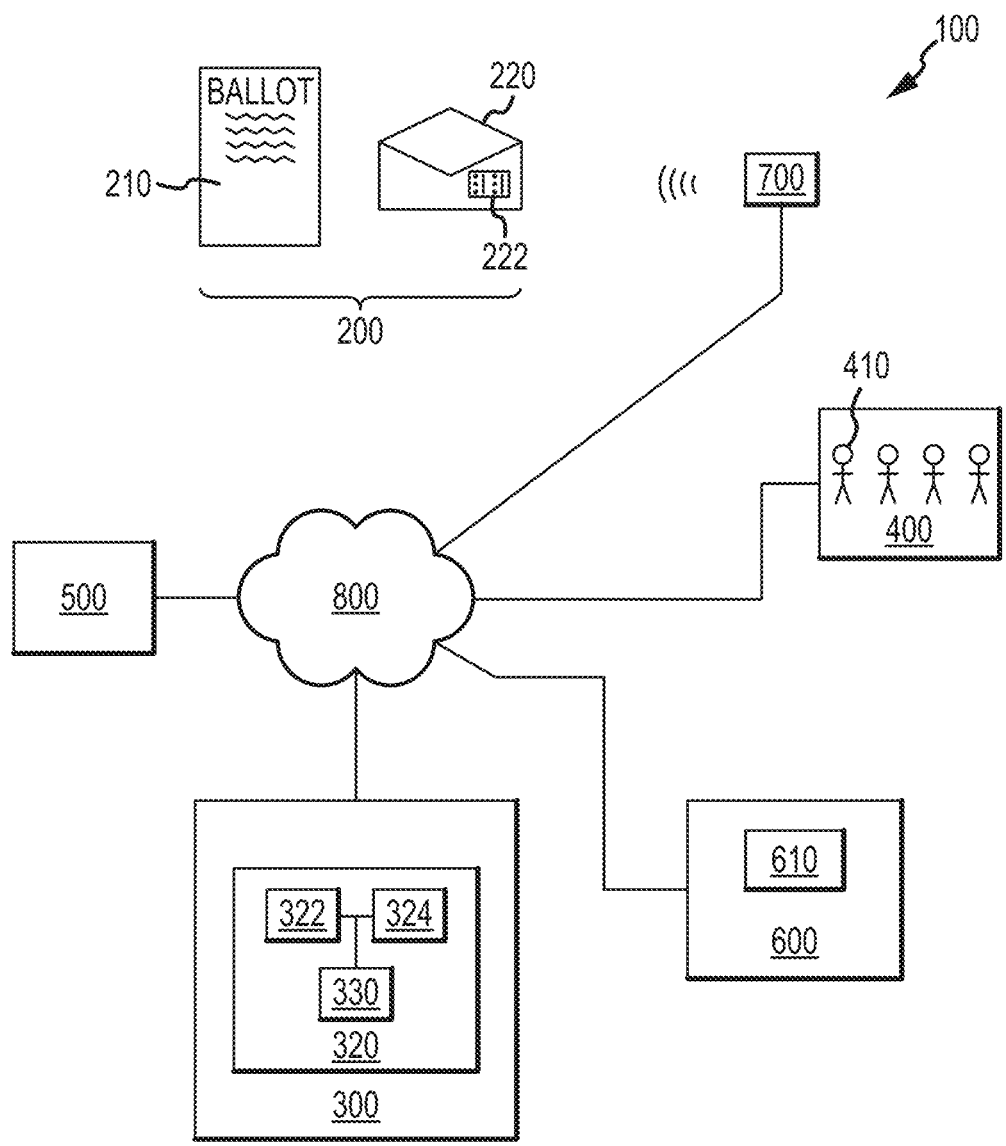
FIG. 1 is a schematic view of one embodiment of a system for monitoring paper ballot materials in accordance with the present disclosure.

Reference will now be made in detail to the accompanying drawings, which at least assist in illustrating various pertinent features of the present disclosure. Referring now to FIG. 1, one embodiment of a system 100 useful for monitoring and reporting the status of paper ballot materials is illustrated. In the illustrated embodiment, the system 100 includes paper ballot materials 200 and a central computer system 300. The paper ballot materials 200 include a paper ballot 210 and an envelope 220 having a unique graphical representation 222 located thereon. This unique graphical representation 222 is associated with a first voter 410 of a plurality of voters 400, and this association is stored in a database module 320 of the central computer system 300.

For example, prior to mailing the paper ballot materials to the first voter 410, the unique graphical representation 222 may be selected and the envelope 220 may be labeled with the unique graphical representation 222. Since the paper ballot materials 200 are unique to the first voter 410, the unique graphical representation 222 will correspond to the first voter 410, and data providing such (UGR data) may be logged in the database module 320.

During the course of the paper ballot's travel from a first destination (e.g., an elections division 500) to a second location (e.g., the residence of the first voter 410), the unique graphical representation 222 may be scanned at various locations (e.g., mailing milestones) via scanner(s) 700. Once scanned, data relating to the status of the paper ballot materials 200 may be communicated to a third-party computer system 600 (e.g., from scanner 700 to outside computer system 600 via network 800), which may be stored in a database module 610. The central computer system 300, which is separate from and remote from the outside computer system 600, may periodically communicate with the outside computer system 600 via network 800, to receive and store at least a portion of the data contained in database 610. Since both databases 320, 610 contain a common element, in this case the UGR data, the status data from database 610 may be readily associated with the paper ballot materials 200 of the first voter 410. In turn, the central computer system 300 may provide status updates to at least one of: (i) the first voter 410 and (ii) the elections division 500 regarding the status of the paper ballot materials. This methodology may be used for several or all voters of the plurality of voters 400, which may enable greater transparency in the paper ballot delivery and receipt process, both by the voters 400 and the elections division 500. In turn, increased confidence in paper ballot voting systems may be realized.

Figure 2:
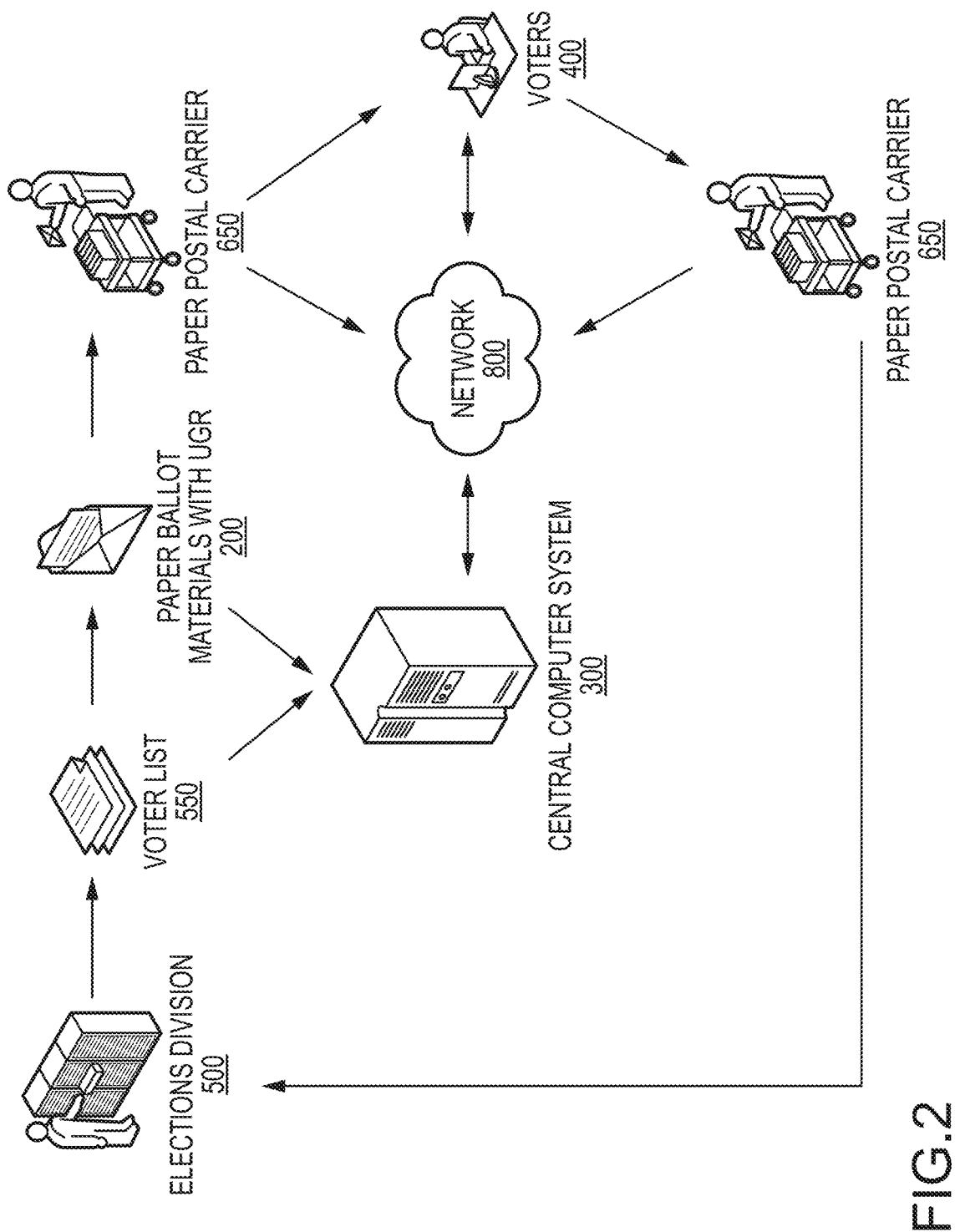
FIG. 2 is a schematic view of one embodiment of a typical process flow for a mail-in paper ballot in accordance with the present disclosure.
Figures 3, 4:
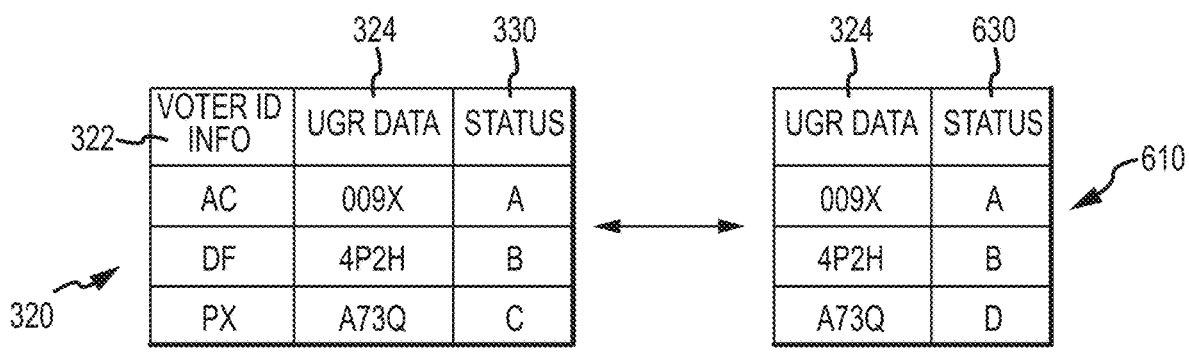
FIG. 3 is a schematic view of one embodiment of a database module useful for storing, reviewing and reporting data in accordance with the present disclosure.
FIG. 4 is a schematic view illustrating one method for updating of data in the database module using status data from a paper postal carrier in accordance with the present disclosure.
Figure 5A:
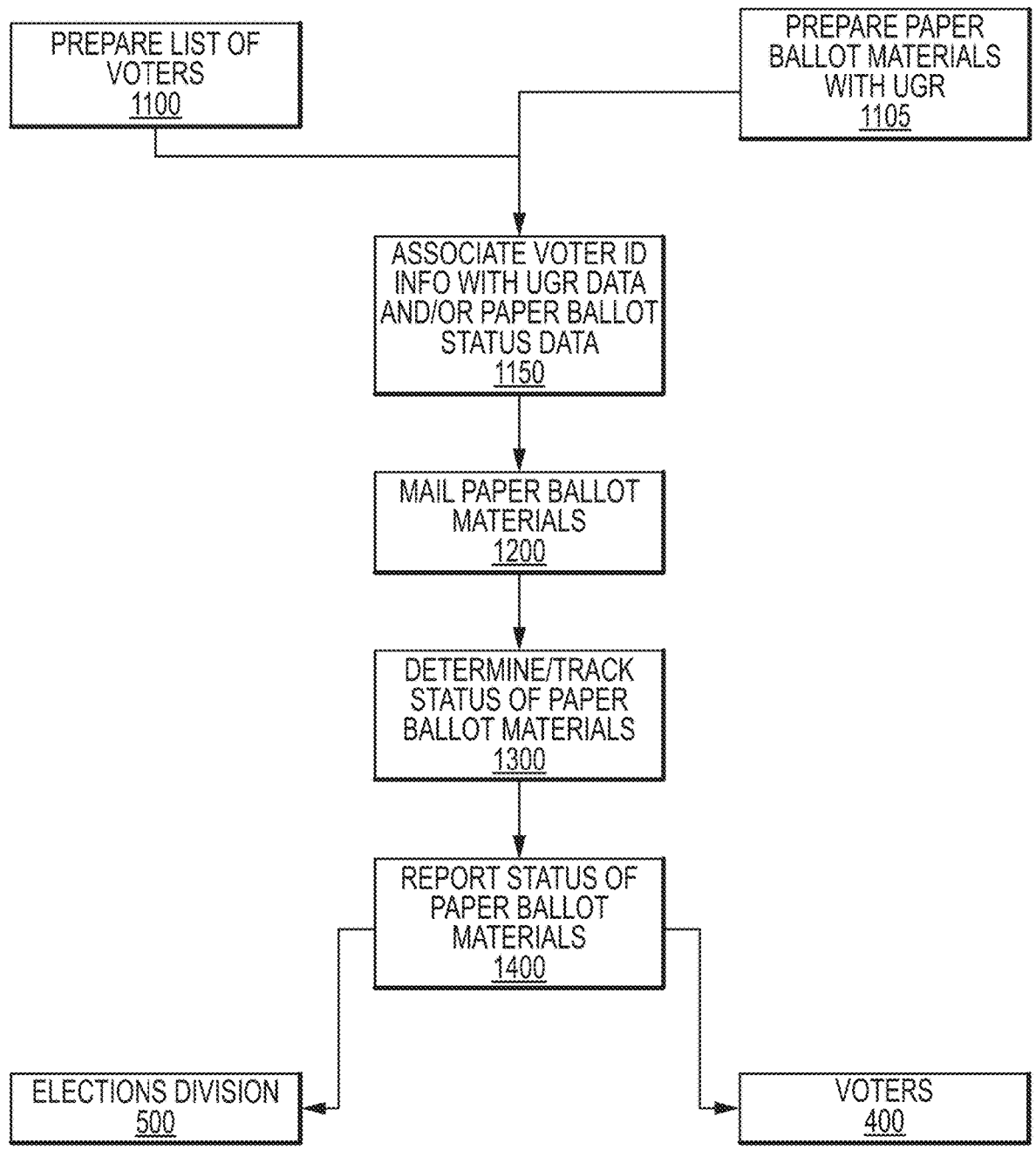
FIG. 5a is a flow chart illustrating one embodiment of a method of reporting paper ballot statuses in accordance with the present disclosure.
Figure 5B:
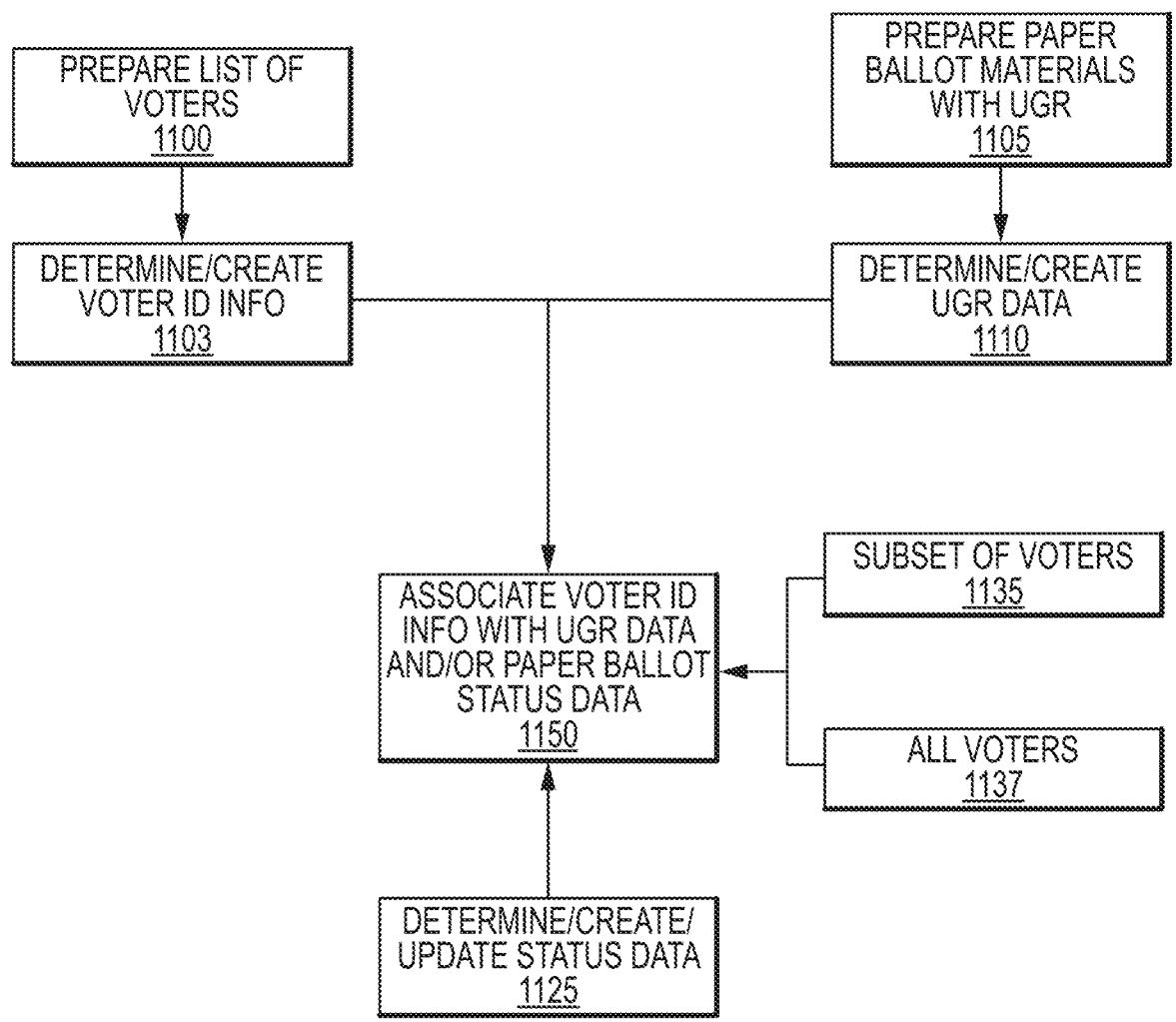
Figure 5C:
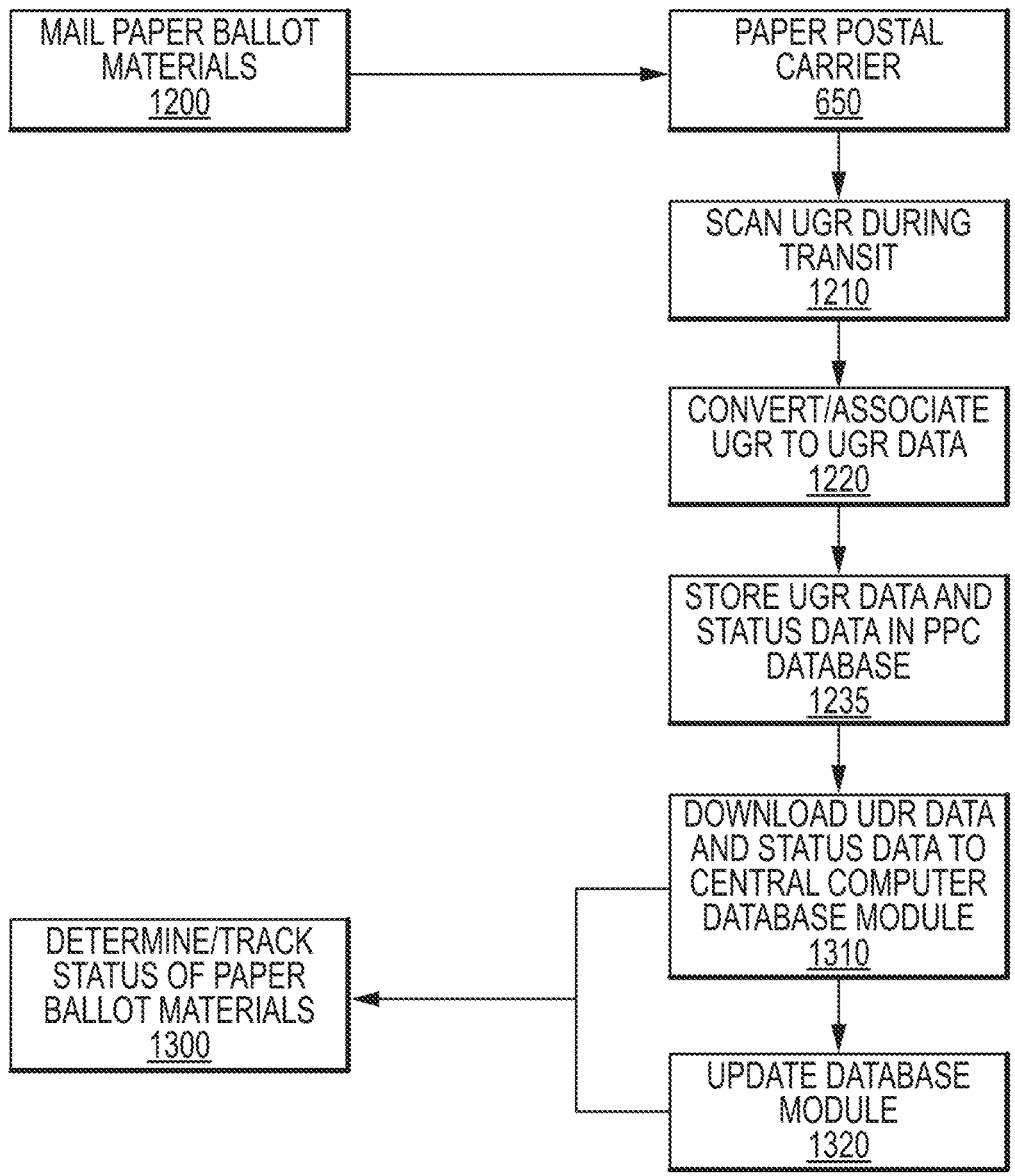

One embodiment of a typical paper ballot reporting process, and associated systems, is illustrated in FIGS. 2-3, with various ones of the corresponding method steps illustrated in FIGS. 5a-5c. Initially, an elections division 500 may prepare a voter list 550. The voter list 550 includes voters 400 who may be participating in an election via mail-in ballots. The voters 400 are generally folks registered with the elections division 500 who are eligible to vote, generally in a government election. From this list, at least a subset of voters of the list of voters 550 may be stored in the database module 320, where voter identification information 322 is used to identify each unique voter. In other words, in some embodiments, at least some voter identification information 322 may be determined and created from the voter list 550. In some embodiments, the subset of voters is equivalent to all voters of the list of voters 550.

The voter identification information 322 may include one or more of the voter's name, address, social security number, driver's license number, date of birth, and electronic addresses, such e-mail address and/or mobile device information (e.g., mobile phone number), to name a few. Voter identification information 322 may facilitate identification of each voter, and thus reporting of paper ballot status data 330 for each voter, as discussed in further detail below. When included in the voter identification information 322, the electronic addresses information may facilitate rapid communication of paper ballot status data 330 to each voter, as described below. Electronic address information may be supplied via the voter list 550, or may be provided individually by each voter, as described in further detail below.

Next, or concomitantly, paper ballot materials 200 for the voters may be prepared. Paper ballot materials 200 are those materials that are used to facilitate voting by paper, and generally via mail-in voting or absentee voting. Paper ballot materials may include the paper ballot itself 210, one or more ballot envelopes 220 (or other ballot mailing containers), and other related documents that facilitate remote voting by paper. Paper ballot materials 200 excludes those ballots that are communicated electronically. Thus, the mailing of such paper ballot materials 200 excludes the use of e-mail or other electronic communication means. In one embodiment, the paper ballot materials 200 are prepared by labeling each voter's paper ballot materials 200 with the unique graphical representation 222. As labeled, each of the paper ballot materials 200 includes a paper ballot 210 and at least one unique graphical representation 222 located on some portion of the paper ballot materials 200 (e.g., the envelope 220, or the paper ballot 210 itself).

The unique graphical representation 222 is a unique combination of graphical elements, where those graphical elements are uniquely arranged such that they may be uniquely identified based on such arrangement. The graphical elements may be any of lines, dots, or other geometrical figures, and/or alpha-numeric characters, among others. Examples of unique graphical representations include data matrices (e.g., bar codes), such as those that are compliant with ISO/IEC16022, entitled "Data Matrix bar code symbology specification." In other embodiments, RFID or similar tags may be used in conjunction with and/or in place of the unique graphical representation 222 to facilitate monitoring/tracking of paper ballot materials 200.

The unique graphical representation 222 generally corresponds to UGR data 324 (unique graphical representation data). UGR data 324 is data, generally in human readable and/or computerized form, such as unique alpha-numeric sequence that corresponds to the unique graphical representation. One example of UGR data is a tracking number. One known, the UGR data 324 may be logged and stored in the database module 320. In this regard, each voter is generally matched/associated to his/her paper ballot materials 200 via the UGR data 324, as illustrated in FIG. 3. The UGR data 324 may be determined/created via any suitable conventional technique, as known to those in the data matrix field. Collectively, voter identification information 322 and the associated UGR data 324 are sometimes referred to herein as unique voter ID data 326.

The database module 320 also includes an association between paper ballot status data 330 and each the voter identification information 322 for each voter. This paper ballot status data 330 facilitates reporting of information relative to the paper ballot materials 200 for each voter. The paper ballot status data 330 is information, usually in the form of computerized data, regarding the location and/or status of one or more voter's paper ballot materials. A few examples of paper ballot status data 330 are included in Table 1, below.

TABLE 1

| Examples of types of paper ballot status data |
|---|
| Prior to receipt by voter |
| Status data |

Not printed
Printed
Printed and scheduled for pick-up by paper postal carrier
Picked-up by paper postal carrier
In transit to voter
Estimated date of delivery TABLE 1-continued Examples of types of paper ballot status data Delivered to voter
Dates associated with any of the above
Location unknown
Ballot lost
Replacement ballot ordered
   Any of the above may be used relative to a
   replacement ballot
      Location
         Elections division or related entity (e.g.,
         ballot printer)
         In transit to voter
            Locations associated with any of the
            above
               After receipt by voter
               Status data Awaiting mailing by voter
Picked-up by paper postal carrier
In transit to elections division
Date mailed by voter
Estimated date of delivery
Delivered to elections division
Date delivered to the elections division
Vote accepted by elections division (e.g., timely and
properly executed)
Vote not accepted by elections division (e.g., not timely
and/or not properly executed)
Dates associated with any of the above
Ballot lost
Replacement ballot ordered
   Any of the above may be used relative to a
   replacement ballot
      Location
         Voter's residence
         In transit to elections division or other entity
            Locations associated with any of the
            above
         Elections division or other entity As shown in Table 1, paper ballot location is a species of the paper ballot status genus.

Using the combination of the voter identification information 322 and the corresponding paper ballot status data 330, the central computer system 300 may rapidly determine a status of each of the paper ballot materials 200 for one or more voters 400. For example, by looking-up the voter identification information 322 for the applicable voters 400, the corresponding status 330 for those voters 400 may be determined, and the central computer system 300 may report the same to those voters 400, or for the elections division 500, as described in further detail below. Usefully, the central computer system 300 may report the status 330 of the paper ballot materials 200 before the paper ballot materials 200 have been mailed, while they are in transit to the voters 400, while they are in transit to the elections division 500, and/or after they have been received by the elections division 500, as described in further detail below. In other words, before or after labeling of the paper ballot materials 200, a paper ballot status data 330 may be determined, created and/or updated relative to each voter's paper ballot materials 200. Reports regarding the status of each voter's paper ballot materials 200 may be readily supplied to each voter, and on an automated or an inquiry basis, as described in further detail below. Paper ballot status data 330 may be used by the elections division 500 to check the status of one or more of the paper ballot materials, as described in further detail below.

Referring now to FIGS. 1-3 and 5a and 5c, after labeling, or concomitant to the labeling, paper ballot materials 200 may be mailed to the voters 400 via paper postal carrier 650.

A paper postal carrier 650 is any mail carrier that is capable of carrying out physical transportation of packages, such as the United States Mail Services, FedEx, UPS, DHL, and the like. During transit to the voters 400, the paper ballot materials 200 may be monitored/tracked at various mailing milestones via scanning of the unique graphical representations 222 located thereon. Likewise, the paper ballot materials 200 may be monitored/tracked during transit from the voters 400 to the elections division 500. For example, the outside computer system 600 may be associated with a paper postal carrier 650, and the unique graphical representation 222 utilized on the paper ballot materials 200 may be supplied by the paper postal carrier 650. As the paper ballot materials 200 travel from a first destination (e.g., the elections division 500) to a second destination (e.g., a voter's residence), the paper postal carrier may scan such unique graphical representation 222 at various milestone locations via scanner(s) 700. The scanner(s) 700 may convert/associate the unique graphical representations 222 with UGR data 324, and may associate that UGR data 324 to a status (e.g., location) of the paper ballot materials 200. This data may be provided to the outside computer 600 (e.g., via network 800), which may be stored in database 610. Periodically, the central computer system 300 may communicate with the outside computer 600 and may download and receive at least a portion of the status data of database 610 from the outside computer 600. In one embodiment, the computer system 600 and corresponding unique graphical representations 222 are those provided by the United States Postal Service and its corresponding Intelligent Mail Barcode technology.

In one example, and with reference now to FIG. 4, the database module 320 may include voter identification data 322, UGR data 324, and current status data 330 for at least some of the voters. The database 610 of the outside computer system 600 may include the UGR data 324 and updated status data 630 associated with the UGR data 324. The central computer system 300 may download and receive at least a portion of the data of database 610, and may compare that current status data 330 to the updated status data 630 of the computer system 600. If the current status data 330 does not match the updated status data 630, then the current status data 330 may be updated or changed in database 320. In the illustrated embodiment, no change in status occurs for voters AC or DF, as the current status is equal to the updated status. However, for voter PX, a change in status has occurred, since the current status is C and the updated status is D. For voter PX, the records in database module 320 would be updated or changed to reflect the updated status of D for voter PX.

Figure 5D:
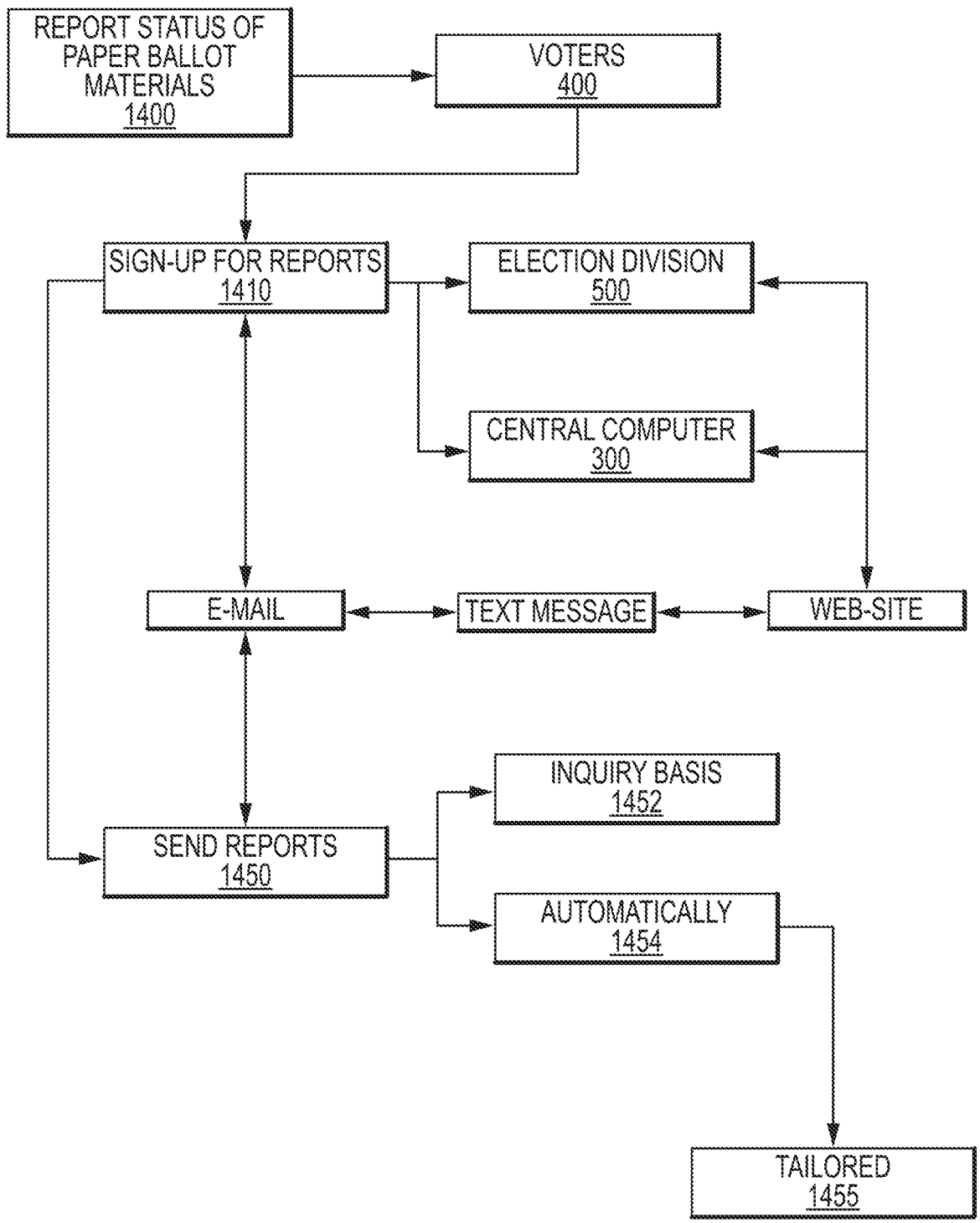
Figure 5E:
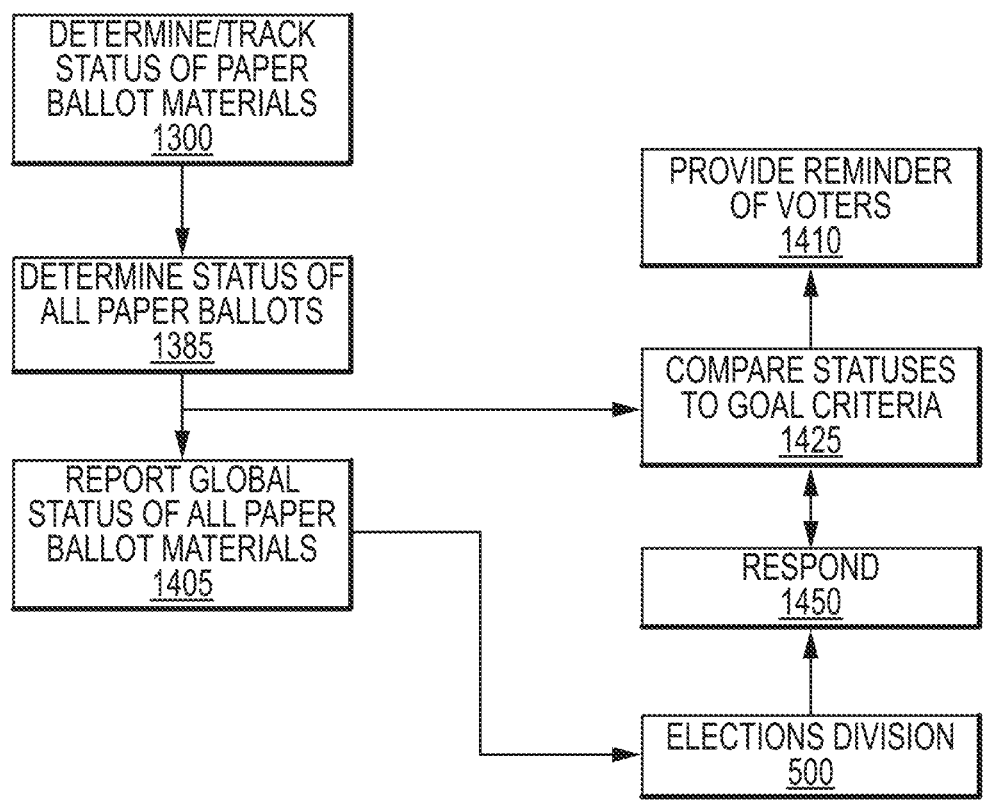
Figure 6:
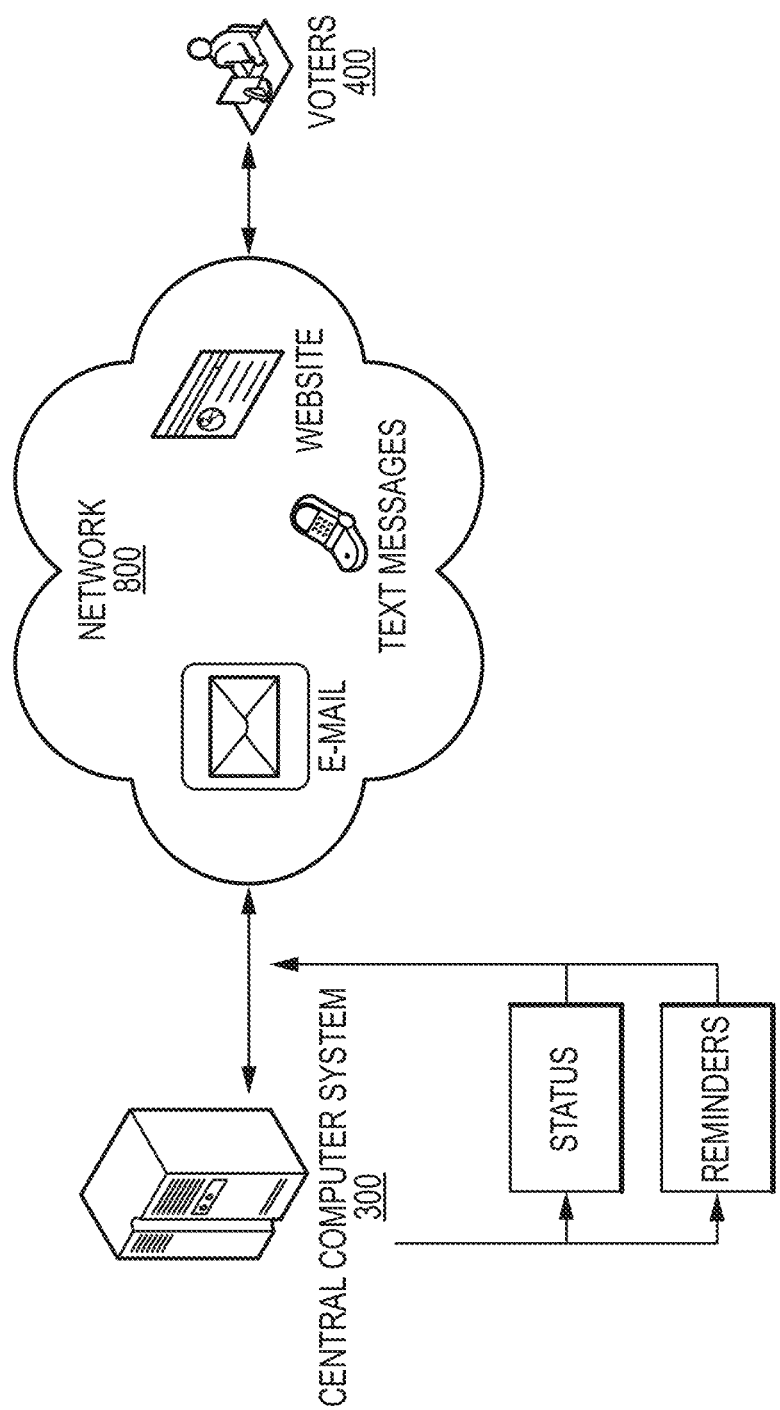
FIG. 6 is a schematic view of a portion of the system of FIG. 1 illustrating the provision of paper ballot status data or reminders to voters.

Referring now to FIGS. 5d and 6, since the status of each voter's paper ballot materials 200 is periodically determined and updated in database module 320, reporting of the status of each voter's paper ballot materials 200 is facilitated. In one embodiment, a list of voters who receive reporting information is created by an "opt-in" strategy, where each voter communicates that he/she would like to receive reports regarding the status of his/her paper ballot materials. In another embodiment, a list of voters who receive reporting information is created by an "opt-out" strategy. In either strategy, the voters may sign-up to receive reports, such as by registering with the election division 500 or the central computer system 300, often via a web-site associated with one or both of those entities, or sometimes via text message or e-mail. In turn, reports may be sent to the applicable voters 400 at various stages of the mail-in voting process, and generally via an electronic communication, (e.g., via network 800 and a web-site, text message or e-mail). Voters may also sign-up for reports when registering to vote, and thus may use paper materials to register for reports in some instances.

In one embodiment, one or more voters of the plurality of voters 400 may check the status of their paper ballots by taking an affirmative action. For example, a voter may send an inquiry to the central computer system 300 to determine the status of his/her paper ballot materials 200. In response, the central computer system 300, which contains the unique voter ID data 326, may locate and send the applicable portion of the paper ballot status data 330 to that voter using at least a portion of the unique voter ID data 326.

In another embodiment, paper ballot status data 330 may be automatically sent to one or more voters 400 upon occurrence of an predetermined event. For example, when the paper ballot status data 330 changes from a first status to a second status, a report may automatically be generated and communicated to the voter associated with that status change. For example, as illustrated in FIG. 4, a message may be automatically sent to voter PX due to the change in his/her paper ballot status data, whereas voters AC and DF would not receive reports at that time since their status has not changed. In some embodiments, the voters 400 are able to select which events they wish to have reported, such as via use of a web-site associated with central computer system 300. For example, each voter may be able to select to receive a report when one or more one or more of the statuses of Table 1 occur. Thus, tailored delivery of status updates to voters may be facilitated.

Figure 7:
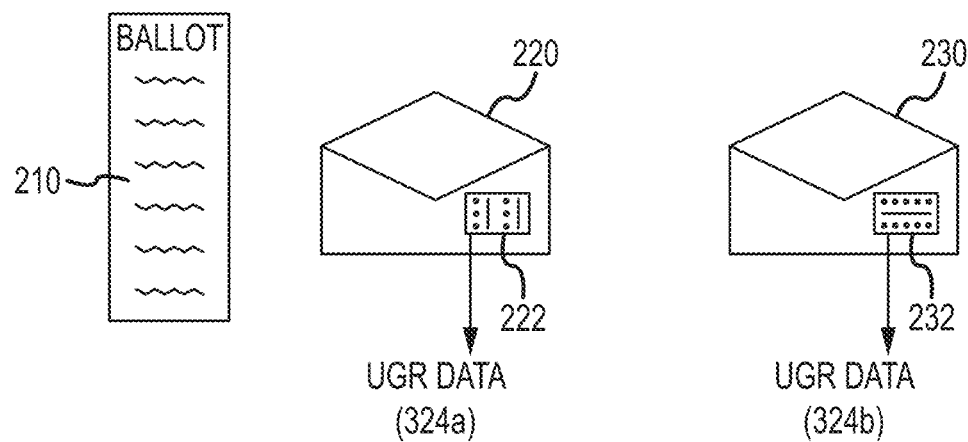
FIG. 7 is a schematic view of another embodiment of paper ballot materials.
Figure 8:
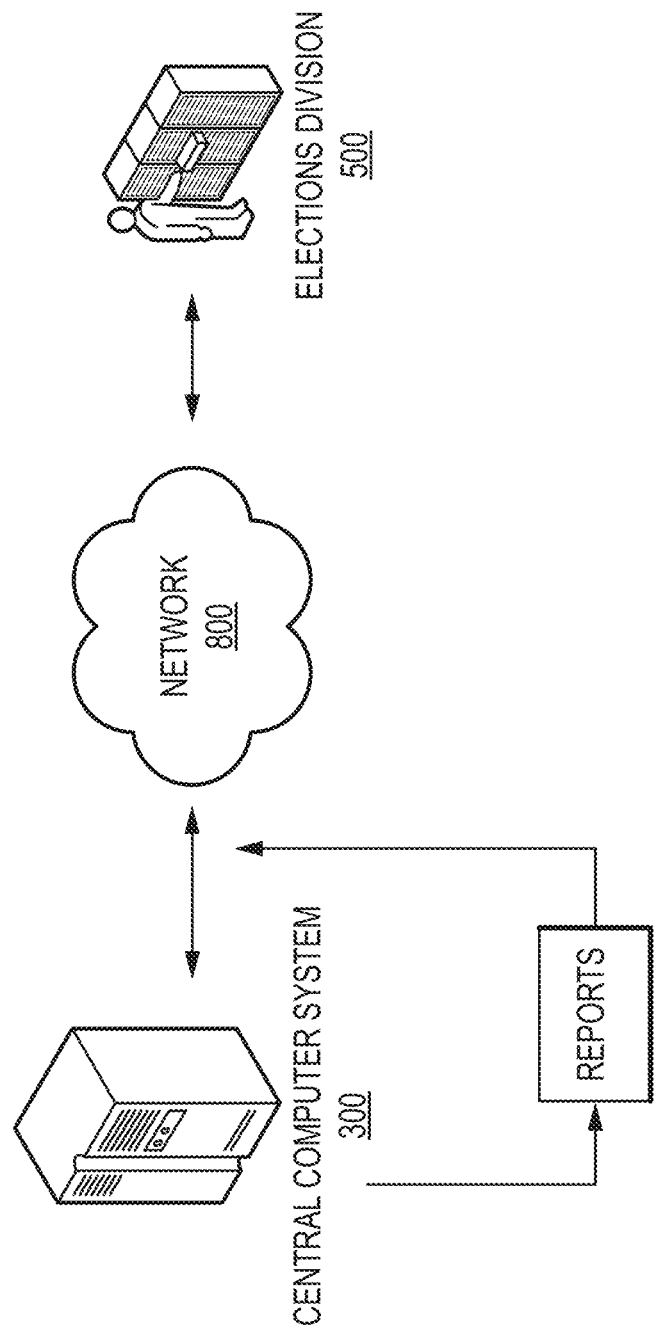
FIG. 8 is a schematic view of a portion of the system of FIG. 1 illustrating the provision of reports to an elections division.

Referring back to FIG. 1, after a voter receives his/her paper ballot materials, he/she generally fills-out at least a portion of the paper ballot 210, and returns the paper ballot 210 to the elections division 500. To facilitate monitoring of paper ballot materials 200 during their travel (i) to the voters, and (ii) from the voters, two envelopes (or more), may be used, where each envelope includes a unique graphical representation, as illustrated in FIG. 7. In this regard, prior to mailing the paper ballot materials to the voters, each envelope 220, 230 may be separately labeled with a respective unique graphical representation 222, 232. As described above, each unique graphical representation 222, 232 may be associated with its respective UGR data 324a, 324b, and the UGR data 324a, 342b specific to each set of paper ballot materials 200 may be logged and stored in the database module 320. Thus, each voter is matched to his/her paper ballot materials 200 via the UGR data 324a, 324b, which facilitates monitoring and status reporting of the paper ballot materials 200 both during transit to and transit from each voter. Other variations may be used.

Another useful embodiment of the presently disclosed systems and methods is the ability to produce reports regarding the status of all paper ballot materials. This information is useful to, for example, the elections division 500, which is generally charged with determining votes for an election, generally for a government election (e.g., a county or municipal elections divisions). Referring now to FIGS. 1, 2, 5e, and 8, since the status of each of the paper ballot materials 200 for each voter of the plurality of voters 400 is known via the above-described monitoring capability, the global status of all paper ballot materials 200 may be determined. In one embodiment, a global ballot status report is prepared by determining the status of each one of a plurality of paper ballot materials via the above-described monitoring capability. The determined status for each voter may be any one of the statuses of Table 1, or other applicable status. With the report, the elections division (500) may check determine (i) the number of received paper ballot materials, (ii) the number of paper ballot materials that are in transit to the elections division by the paper postal carrier, and/or (iii) the number of paper ballot materials that were mailed by a specific date, among other useful information. Thus, the elections division 500 may be able to readily determine the location and status of each paper ballot of a plurality of paper ballots. This reporting capability, which is facilitated by above-described monitoring capability, may facilitate increased certainty in the election results.

Another useful embodiment of the present disclosure is the ability to provide notifications/reminders to the elections division and/or one or more voters. Generally, mail-in ballots must be mailed to and/or received by the elections division 500 by a specific date. Since the status of each paper ballot 210 for each voter is known, reminders may be provided to those voters 400 who have yet to achieve a predetermined status. For example, and with reference to FIGS. 5e, 6 and 8, the central computer system 300 may compare current paper ballot status data 330 to goal criteria. For those voters 400 whose current paper ballot status data 330 has not achieved a certain goal criteria, reminders may be provided to those voters. As one example, the goal criteria may be "ballot mailed to or received by the elections division", and if the paper ballot status is not in accordance with that criteria, a reminder/notification may be provided to the applicable voters. Other variations may be used, and based on any of the statuses listed in Table 1, among other statuses. The goal criteria may be stored in database module 320 to facilitate comparisons.

Similarly, reminders may be provided to the elections division 500, or an entity related thereto (e.g., if the elections division is not associated with central computer system 300). For example, as described above, since the status of each paper ballot materials 200 for each voter is known, the elections division 500 may be able to determine when one or more paper ballot materials 200 may have been lost, destroyed or otherwise. In this instance, goal criteria again may be compared to the statuses, where if current paper ballot status data 330 matches or does not match one or more goal criteria, a notification may be provided so that a response relative to those specific paper ballot materials 200 may be taken. For example, if a paper ballot 210, was confirmed as printed, but has not yet been mailed within a specified period, then the elections division 500 may be able to locate and/or reprint that paper ballot 210, so that it is timely received by a voter. Similarly, if paper ballot materials 200 were confirmed as mailed by a voter, but have not yet been received by the elections division 500 within a specified period, then the elections division 500 may be able to contact the paper postal carrier 650 to facilitate location and tracking of the paper ballot materials 200. Other variations may be used.

Another useful embodiment is the ability to provide each voter a notification regarding the acceptance or rejection of his/her paper ballot 210. As noted above in Table 1, paper ballot status data 330 may include whether a paper ballot 210 for a specific voter was accepted or rejected by the election division. Thus, in one embodiment, the central computer system 300 receives data from the elections division 500 regarding whether a paper ballot 210 was accepted or rejected. Using the voter identification information 322 in combination with the data received from the elections division 500, a determination may be made as to which voter's paper ballots 210 were rejected or accepted. In turn, reports may be sent to those voters whose paper ballots 210 were rejected, and/or to those whose paper ballots 210 were accepted by the elections division 500. Information regarding why such votes were rejected or accepted may optionally be provided in such reports. If such reports are provided in timely fashion, some of the voters whose paper ballots 210 were rejected may be able to take appropriate corrective action so that his/her paper ballots 210 is properly corrected and accepted by the elections division 500, and by the election deadline.

To facilitate communication with the voters and/or elections divisions, the central computer system 300 may include a communications module (not illustrated), which is configured to receive and report applicable data of the database module. The communications module may be an integral part of the central computer system 300, or may be located remotely. The communications module may be any known/developed hardware/software that is able to receive and report applicable data of the database module 320 to the voters and/or elections divisions.

The systems and methods describe above are examples only, and generally with the frame of reference that the central computer system 300 is not associated with the elections division. In such embodiments, the elections division 500 may provide the voter list 550 to an entity or entities associated with the central computer system 300, such as one or more subcontractors or vendors of the elections division. This entity would generally receive the voter list 550, prepare the unique voter ID data 326, as well as monitor the status of the paper ballot materials 200, and log the corresponding paper ballot status data 330. This entity would also generally provide the above-described reports to the voters 400 and/or the elections division 500. This entity may also receive paper ballot status data 330 from the elections division 500, such as paper ballot 210 rejected or accepted, for facilitating reporting of paper ballot status updates to the voters 400. In these embodiments, the paper ballot status data 330 and/or the unique user ID data 326 may optionally be provided to the elections division 500, and in any suitable manner, such as via an FTP download to the election division computers (e.g., a global download of all paper ballot status data, or a subset thereof), or automated e-mail of reports, and vice-versa.

In other embodiments, the elections division 500 may be associated with the central computer system 300, and such embodiments are within the scope and spirit of the present invention. In these embodiments, the monitoring and the reporting of the paper ballot status data 330 to the voters 400 may be completed by the elections division 500, similar to as provided above. The global reports used to monitor/track the overall status of the paper ballot materials may similarly be prepared, but would be used internally by the elections division 500, instead of being communicated to the elections division 500. Other modifications to the above general description may be accomplished by those skilled in the art to facilitate monitoring and reporting of paper ballot status data 330 by the elections division 500 via the central computer system 300.

Furthermore, while the central computer system 300 has been illustrated as being at a single location, it may be located at many locations, and using any number of computers, and may be owned by any number of entities. Likewise, the database module 320 is illustrated as being a single database. However, the database module 320 may be separated into separate components and/or located on various computer systems. In one embodiment, the paper ballot status data 330 and the unique user ID information 326 are contained in the same database. In other embodiments, the data are maintained in separate databases, but are able to communicate with one another to enable the preparation of the reports and/or notifications described above (e.g., communicate via network 800).

Furthermore, while the outside computer system 600 has generally been described as being associated with the paper postal carrier and remote from the central computer system 300, in some embodiments that computer system 600 may be integrated with the central computer system 300. Furthermore, there may be several outside computer systems 600, and which may be associated with one or more entities that provides status data relating to the paper ballot materials. For example, a first outside computer system may be associated with a first paper postal carrier 650, and a second outside computer system may be associated with a second paper postal carrier 650, such as when a first postal carrier is used to deliver the paper ballot materials 200 to one or more voters 400, and a second and different paper postal carrier is used to deliver the paper ballot materials from one or more voters 400 to the elections division. As another example, a first outside computer system may be associated with a paper postal carrier 650, and a second outside computer system 600 may be associated with the elections division 500. In any of these embodiments, the central computer system 300 may communicate with such outside computer system(s) 600 to receive status data relating to paper ballot materials, and, if necessary, update the database module 320 in view of such received data.

While various embodiments of the new technology described herein have been described in detail, it is apparent that modifications and adaptations of those embodiments will occur to those skilled in the art. However, it is to be expressly understood that such modifications and adaptations are within the spirit and scope of the presently disclosed technology.

What is claimed is:

1. A method comprising:
  receiving, by a processor of a computer system, voter and ballot data comprising:
    voter information associated with a ballot, wherein the voter information comprises:
      a mailing address; and
      at least one of an e-mail address or mobile device information;
    a first unique identifier associated with the ballot or a voter, wherein a first graphical representation of the first unique identifier is on a first envelope; and
    a second unique identifier associated with the ballot or the voter, wherein a second graphical representation of the second unique identifier is on a second envelope;
  receiving, by the processor, first data indicative of a scanning of the first graphical representation of the first unique identifier, wherein:
    the first envelope contains the ballot and the second envelope,
    the first data is further indicative that the first envelope has been picked up by a postal carrier for delivery to the mailing address, and
    the first data is received from a postal carrier computing system;
  sending, by the processor based on the first data, a first status update using the e-mail address or the mobile device information, the first status update indicating that the ballot has been picked up by the postal carrier for delivery to the mailing address;
  receiving, by the processor, second data indicative of the ballot being in transit to the mailing address, wherein the second data is received from the postal carrier computing system after the first data is received;

sending, by the processor based on the second data, a second status update using the e-mail address or the mobile device information, the second status update indicating that the ballot is in transit to the mailing address;

receiving, by the processor, third data indicative of the ballot being delivered to the mailing address, wherein the third data is received from the postal carrier computing system after the second data is received;

sending, by the processor based on the third data, a third status update using the e-mail address or the mobile device information, the third status update indicating that the ballot has been delivered to the mailing address, wherein the mailing address is a final destination of the first envelope;

receiving, by the processor, fourth data indicative of a scanning of the second graphical representation of the second unique identifier, wherein:
the second envelope contains the ballot,
the fourth data is further indicative that the second envelope has been picked up by the postal carrier for delivery to an address associated with a destination different from the mailing address,
the scanning of the second graphical representation comprises scanning the second graphical representation and converting, by a scanner, the second graphical representation into the fourth data, and
the fourth data is received from the postal carrier computing system after the third data is received;

determining, by the processor based on information stored in a database comprising associations between voters and ballots, a match between the fourth data and the second unique identifier;

sending, by the processor based on the fourth data and the match, a fourth status update using the e-mail address or the mobile device information, the fourth status update indicating that the ballot has been picked up by the postal carrier for delivery to the address associated with the destination;

receiving, by the processor, fifth data indicative of being in transit to the address associated with the destination, wherein the fifth data is received from the postal carrier computing system after the fourth data is received;

sending, by the processor based on the fifth data, a fifth status update using the e-mail address or the mobile device information, the fifth status update indicating that the ballot is in transit to the address associated with the destination;

receiving, by the processor, sixth data indicative of the ballot being delivered to the address associated with the destination, wherein the sixth data is received from the postal carrier computing system after the fifth data is received; and sending, by the processor based on the sixth data, a sixth status update using the e-mail address or the mobile device information, the sixth status update indicating that the ballot has been delivered to the address associated with the destination.

2. The method of claim 1, wherein the destination comprises an elections division.

3. The method of claim 1, wherein the first envelope is labeled with the first graphical representation and the second envelope is labeled with the second graphical representation.

4. The method of claim 1, wherein the first unique identifier and the second unique identifier are different.

5. The method of claim 1, wherein the first unique identifier and the second unique identifier are the same.

6. The method of claim 1, further comprising receiving, by the processor, seventh data indicative of a request from a voter computing device to receive electronic updates regarding the ballot of the voter.

7. The method of claim 1, wherein the sending of the first status update using the e-mail address or the mobile device information comprises sending a text message to a mobile device associated with the voter using the mobile device information.

8. The method of claim 1, wherein the sending of the first status update using the e-mail address or the mobile device information comprises sending an e-mail message to a computing device associated with the voter using the e-mail address.

9. The method of claim 1, wherein the receiving of the voter and ballot data by the processor of the computer system further comprises the processor receiving the voter and ballot data from a computing device associated with an elections division.

10. The method of claim 1, wherein the first graphical representation comprises a data matrix or bar code.

11. The method of claim 1, wherein the first graphical representation comprises graphical elements including one or more of lines, dots, geometrical figures, or alpha-numeric characters.

12. The method of claim 1, wherein:
the first graphical representation comprises a unique arrangement of graphical elements on the first envelope;
the scanning of the first graphical representation comprises:
scanning, with the scanner, the graphical elements of the first graphical representation; and
converting, by the scanner, the unique arrangement of graphical elements to the first unique identifier; and
the first data indicative of the scanning of the first graphical representation is received by the processor from the scanner.

13. The method of claim 12, wherein the first data, indicative of the scanning of the first graphical representation, further comprises the first unique identifier as converted by the scanner from the unique arrangement of graphical elements.

14. The method of claim 12, wherein the unique arrangement of graphical elements on the first envelope is labeled on the first envelope.

15. A method comprising:
receiving, by a processor of a computer system, voter and ballot data comprising:
voter information associated with a ballot, wherein the voter information comprises at least a mailing address;
a first unique identifier associated with the ballot or a voter, wherein a first graphical representation of the first unique identifier is on a first envelope; and
a second unique identifier associated with the ballot or the voter, wherein a second graphical representation of the second unique identifier is on a second envelope;
receiving, by the processor, first data indicative of a scanning of the first graphical representation of the first unique identifier, wherein:
the first envelope contains the ballot and the second envelope, the first data is further indicative that the first envelope has been picked up by a postal carrier for delivery to the mailing address, and
the first data is received from a postal carrier computing system;
updating, by the processor based on the first data, a status report on a web-site to indicate that the ballot has been picked up by the postal carrier for delivery to the mailing address;
receiving, by the processor, second data indicative of the ballot being in transit to the mailing address, wherein the second data is received from the postal carrier computing system after the first data is received;
updating, by the processor based on the second data, the status report on the web-site to indicate that the ballot is in transit to the mailing address;
receiving, by the processor, third data indicative of the ballot being delivered to the mailing address, wherein the third data is received from the postal carrier computing system after the second data is received, and wherein the mailing address is a final destination of the first envelope;
updating, by the processor based on the third data, the status report on the web-site to indicate that the ballot has been delivered to the mailing address;
receiving, by the processor, fourth data indicative of a scanning of the second graphical representation of the second unique identifier, wherein:
the second envelope contains the ballot,
the fourth data is further indicative that the second envelope has been picked up by the postal carrier for delivery to an address associated with a destination different from the mailing address,
the scanning of the second graphical representation comprises scanning the second graphical representation and converting, by a scanner, the second graphical representation into the fourth data, and
the fourth data is received from the postal carrier computing system after the third data is received;
determining, by the processor based on information stored in a database comprising associations between voters and ballots, a match between the fourth data and the second unique identifier;
updating, by the processor based on the fourth data and the match, the status report on the web-site to indicate that the ballot has been picked up by the postal carrier for delivery to the address associated with the destination;
receiving, by the processor, fifth data indicative of being in transit to the address associated with the destination, wherein the fifth data is received from the postal carrier computing system after the fourth data is received;
updating, by the processor based on the fifth data, the status report on the web-site to indicate that the ballot is in transit to the address associated with the destination;
receiving, by the processor, sixth data indicative of the ballot being delivered to the address associated with the destination, wherein the sixth data is received from the postal carrier computing system after the fifth data is received; and
updating, by the processor based on the sixth data, the status report on the web-site to indicate that the ballot has been delivered to the address associated with the destination.

16. The method of claim 15, wherein the status report is displayed on the web-site.

17. The method of claim 15, wherein the status report is displayed on a web-connected graphical user interface.

18. The method of claim 15, wherein the updating of the status report occurs via a webconnected network.

19. A method comprising:
receiving, by a processor of a computer system, voter and ballot data comprising voter information associated with a ballot, wherein the voter information comprises a mailing address and at least one of an e-mail address or mobile device information;
receiving, by the processor from a postal carrier computing system, first data indicative of the ballot being in transit to the mailing address;
sending, by the processor based on the first data, a first status update using the e-mail address or the mobile device information, the first status update indicating that the ballot is in transit to the mailing address;
receiving, by the processor from the postal carrier computing system after the first data is received, second data indicative of the ballot being delivered to the mailing address;
sending, by the processor based on the second data, a second status update using the e-mail address or the mobile device information, the second status update indicating that the ballot has been delivered to the mailing address, wherein the mailing address is a final destination of a first envelope containing the ballot and a second envelope;
receiving, by the processor from the postal carrier computing system after the second data is received, third data indicative of the ballot being delivered in the second envelope to an address associated with a destination different from the mailing address, wherein:
the second envelope includes a graphical representation, and
the third data indicative of the ballot being delivered is based on a scanner that scans the graphical representation and converts the graphical representation into a unique identifier associated with the ballot or a voter;
determining, by the processor based on information stored in a database comprising associations between voters and ballots, a match between the third data and the unique identifier; and
sending, by the processor based on the third data and the match, a third status update using the e-mail address or the mobile device information, the third status update indicating that the ballot has been delivered to the address associated with the destination.

20. The method of claim 19, wherein the voter information further comprises the unique identifier associated with the ballot or the voter, wherein the graphical representation of the unique identifier is on the first envelope or the ballot.

21. The method of claim 20, wherein at least one of the receiving the first data or the receiving of the second data is based on a scanning of the graphical representation on the first envelope or the ballot.

22. The method of claim 20, wherein the graphical representation comprises a machine-readable code.

23. The method of claim 19, further comprising receiving, by the processor, fourth data indicative of a request from a voter computing device to receive electronic updates regarding the ballot of the voter.

24. The method of claim 19, further comprising receiving, by the processor, fourth data indicative of a request from a voter computing device to receive the ballot by mail at the mailing address.

25. The method of claim 19, wherein the sending of the first status update using the e-mail address or the mobile device information comprises sending a text message to a mobile device associated with the voter using the mobile device information.

26. The method of claim 19, wherein the sending of the first status update using the e-mail address or the mobile device information comprises sending an e-mail message to a computing device associated with the voter using the e-mail address.

* * * * *